United States Patent [19]

Boult

[11] Patent Number: 5,801,339
[45] Date of Patent: Sep. 1, 1998

[54] LOAD MEASURING APPARATUS

[75] Inventor: Brian Frederick Boult, Auckland, New Zealand

[73] Assignee: Tru-Test Limited, Auckland, New Zealand

[21] Appl. No.: 396,140

[22] Filed: Mar. 1, 1995

[30] Foreign Application Priority Data

Mar. 3, 1994 [NZ] New Zealand ............................ 260019
Nov. 14, 1994 [NZ] New Zealand ............................ 260019

[51] Int. Cl.⁶ .................................................. G01G 21/08
[52] U.S. Cl. ............................... 177/261; 177/DIG. 9
[58] Field of Search ........................ 177/261, 211, 177/DIG. 9; 73/862.632, 862.635, 715, 720, 726

[56] References Cited

U.S. PATENT DOCUMENTS

| | | | |
|---|---|---|---|
| 2,995,034 | 8/1961 | Boiten ............................... | 177/211 |
| 3,289,134 | 11/1966 | Laimins et al. ..................... | 73/720 |
| 3,915,248 | 10/1975 | Paelian ............................... | 177/255 X |
| 4,355,692 | 10/1982 | Ostrelich ............................ | 177/211 |
| 4,548,086 | 10/1985 | Kästel ................................. | 73/862.635 |
| 4,560,017 | 12/1985 | Hood ................................... | 177/211 |
| 4,744,254 | 5/1988 | Barten ................................ | 73/862.632 |

*Primary Examiner*—Michael L. Gellner
*Assistant Examiner*—Randy W. Gibson
*Attorney, Agent, or Firm*—Jacobson, Price, Holman & Stern, PLLC

[57] ABSTRACT

Load measuring apparatus particularly but not solely for the weighing of animals is supported on load-bearing feet. Each load bearing foot provides an electrical signal indicating the load thereon and the sum of the electrical signals indicates the total load. Each load bearing foot has a strut which is in use attached to the load, housing which rests on a load-bearing surface and a load cell which is fixed within housing and transmits the load force carried by strut to housing and thence to the load-bearing surface. The strut passes through an aperture in housing to bear against load cell which is in the central cavity of the housing. The strut is able to move towards load cell, but is substantially restricted from moving away from the load cell, and preferably is able to have some rotational movement relative to base. The load-bearing feet overcome the bulkiness and expensiveness of prior art weighing systems and are portable, inexpensive and accurate in use.

27 Claims, 4 Drawing Sheets

LOAD MEASURING APPARATUS

BACKGROUND TO THE INVENTION (1) Field of the Invention

This invention relates to load measuring apparatus and in particular but not solely a weighing system and load measuring transducers therefor.

(2) Description of the Prior Art

In the weighing of animals, for example, it is known to provide a platform upon which the animal stands, which platform is supported by beams which deflect due to the animal's weight. Such beams are provided with strain gauges which provide an output which is a function of the deflection of the beams and when suitably calibrated, the animal's weight. An electronic processor supplies current to the strain gauges and measures the value of the output signal from the strain gauges to provide on a digital display the value of the animal's weight.

Such animal weighing systems (excluding the platform which is usually provided by the apparatus installer) are bulky and expensive to produce.

It is an object of the present invention to provide a weighing system and/or components therefor which overcome the above-mentioned disadvantages or which at least provide purchasers with a useful choice.

BRIEF SUMMARY OF THE INVENTION

Accordingly, in one aspect the invention may broadly be said to consist in a load bearing foot comprising:
- a housing having a base which in use is supported by a load bearing surface and an aperture in said housing opposite said base,
- a load cell means which is mechanically supported by and within said housing, and a strut which engages with said load cell means and extends outside said housing through said aperture, said strut in use being connected to the applied load,
- said strut being free to move axially in a direction towards said load cell means.

In a second aspect the invention may broadly be said to consist in a load measuring transducer comprising:
- a housing having a base which in use is supported by a load bearing surface and an aperture in said housing opposite said base,
- a load cell means which is mechanically supported by and within said housing, and a strut which engages with said load cell means and extends outside said housing through said aperture, said strut in use being connected to the applied load,
- said strut being free to move axially in a direction towards said load cell means, and said load cell means providing an electrical output which is a function of the applied load.

In a third aspect the invention may broadly be said to consist in a weighing system comprising:
- a platform having an area to accommodate the physical dimensions of the load to be weighed,
- at least one foot attached to said platform to support it on a load bearing surface, each said foot including:
  - a housing having a base which in use is supported by a load bearing surface and an aperture in said housing opposite said base,
  - a load cell means which is mechanically supported by and within said housing,
  - a strut which engages with said load cell means and extends outside said housing through said aperture, said strut in use being connected to said platform,
  - said strut being free to move axially in a direction towards said load cell means
- and electronic summing means which receive the electrical signals from each load cell and provide an output signal having a value which is a function of the weight of said load.

BRIEF DESCRIPTION OF THE DRAWINGS

Preferred embodiments of the present invention will now be described with reference to the accompanying drawings in which.

DETAILED DESCRIPTION

Figure 1:
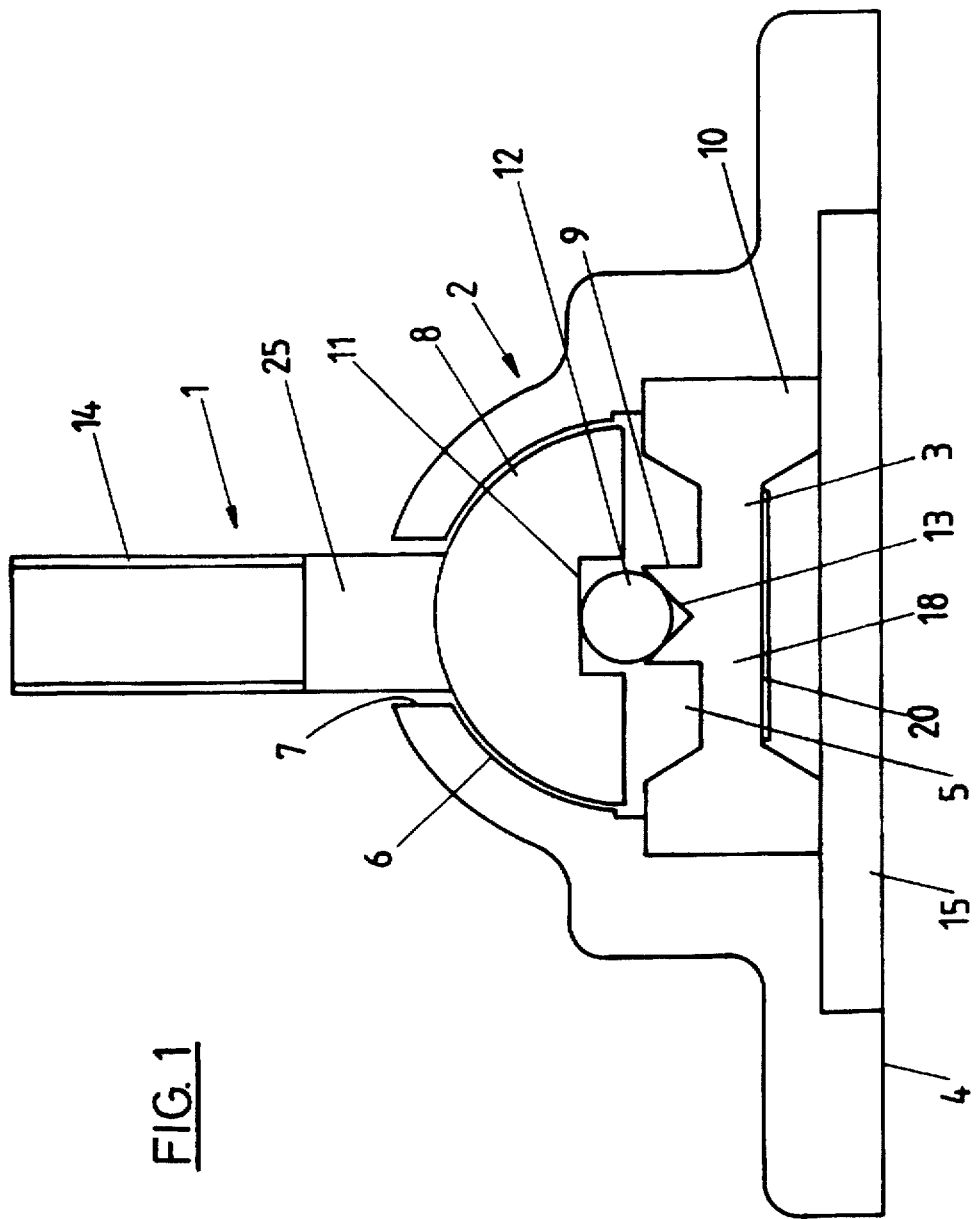
FIG. 1 shows a diametrical cross-section through a load bearing foot for use in a weighing system.

Referring to FIG. 1 the load bearing foot consists of three main parts—a strut 1 which in use is attached to the load, a housing 2 which in use rests on a load bearing surface and a load cell 3 which is fixed within housing 2 and transmits the load force carried by strut 1 to housing 2 and thence to the load bearing surface.

The foot housing has a base 4 of sufficient diameter to ensure reasonable bearing pressure when in use and incorporates a central cavity 5 having a hemispherical top surface 6. An aperture 7 is provided concentrically with the pole of the hemispherical surface to allow the load bearing strut 1 to enter housing 2. The aperture 7 has a greater diameter than that of strut 1 to allow a limited degree of rotation of strut 1 relative to the base 4.

Strut 1 takes the form of a rod 25 and is fixed to a hemispherical retaining member 8, the radius of this hemisphere being substantially identical to the radius of the hemispherical surface 6. As is shown in the drawing, the rod retention member in combination with the housing cavity permits retention of the strut while allowing angular rotation off the perpendicular within the limits defined by the diameter of aperture 7.

Mounted within housing 2 is a load cell 3. In the embodiment of the invention shown in FIG. 1, this load cell is of the diaphragm strain gauge type adapted to receive applied load through a central abutment 9 and to resist reactive forces at the perimeter rim 10. A resistive strain gauge 20 is bonded to the diaphragm 18 of the load cell. To allow for strut movement off the perpendicular (foot not on level ground) while at the same time permitting the whole of the force applied to strut 1 to be transferred to load cell 3 a single point contact system is used between strut 1 and load cell 3. This is provided by forming a central recess 11 within the bottom surface of retention member 8 which accommodates a spherical ball bearing 12 which rests within conical surface 13 of diaphragm abutment 9. The rod retention member 8 bears against ball bearing 12 at a single point.

Electrical outputs from a resistive strain gauge 26 are indicative of the load applied to the load cell, due to the deformation of the load cell diaphragm when a load is applied.

Figure 2:
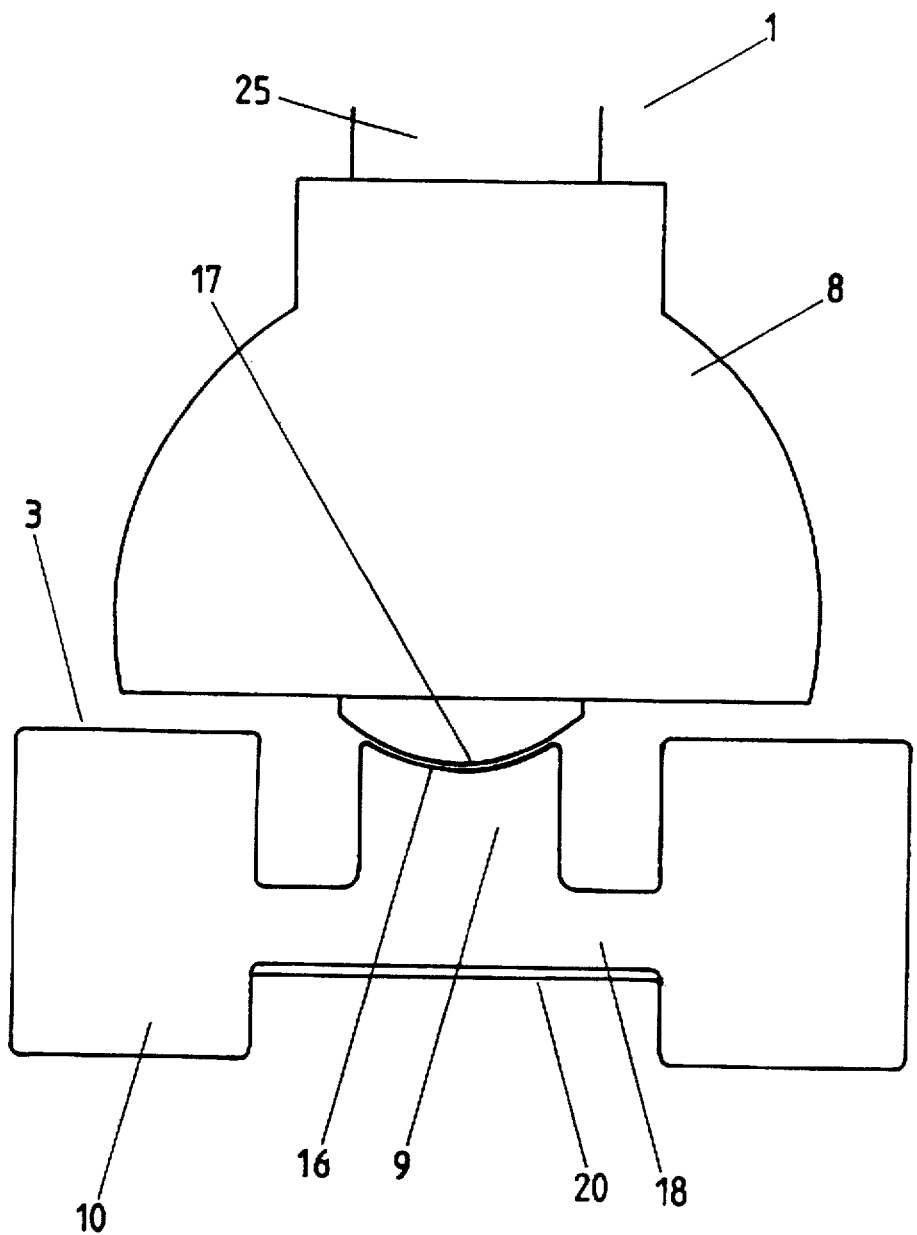
FIG. 2 shows a diametrical cross-section through the load cell and strut according to a preferred embodiment of the present invention.

In the alternative and preferred embodiment of the load cell shown in FIG. 2, it is also a diaphragm type adapted to receive applied load through central abutment 9 and to resist the reactive forces at the perimeter rim 10. However, to allow for strut movement off the perpendicular, while at the same time permitting the whole of the force applied to strut 1 to be transferred to load cell 3 through the abutting surfaces of the abutment 9 and the strut 1, one of the abutting surfaces is formed as a spherically curved depression 16, while the other surface is a complementary spherically curved dome 17.

It is preferred that the centre of curvature of these abutting surfaces is coincident with the centre of curvature of the hemispherical surface 6 and of the hemispherical retaining member 8, so that free rotation is able with constant tolerances between the hemispherical surface 6 and hemispherical retaining member 8. It is also preferable that the diameter of the strut 1 is larger than the diameter of abutment 9, so that load is less capable of being localised in abutment 9.

Figure 3:
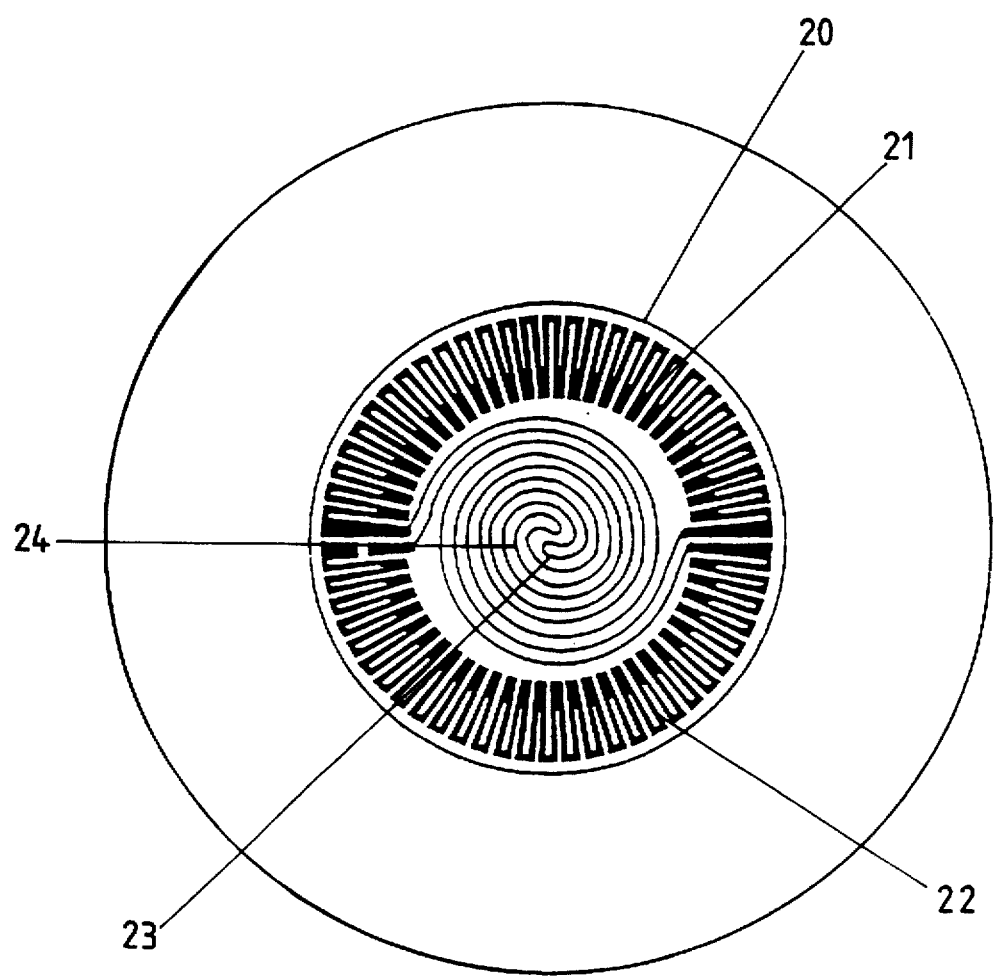
FIG. 3 shows an underneath view of the load cell of the preferred embodiment of the present invention, including strain gauge.

Other aspects of the embodiment shown in FIG. 2 are also considered advantageous. It has been found that the arrangement of load cell features and the relative dimensions of the features are important to the performance of the load cell. An arrangement of the features and relative dimensions which has been found optimal by trial and error testing, is shown in FIG. 3 which is to scale. Effectively it has been found that the configuration shown and in particular the relative relationship of the dimensions is optimal for producing a diaphragm load cell of very small size. For example a cell having overall diameter of less than 50 mm is possible for measuring weights up to 1000 kg with reasonable accuracy.

The material of construction of the load cell is also important, as the material properties cause variation in the performance of the diaphragm under load. It is envisaged that the cell could be made for example from aluminum or steel, and it has been found that in particular the aluminum alloy 2024 T81 is suitable. It has also been found that in relation to material, forming processes are important, and although the load cell could be made by machining from a large billet, it is preferred that the load cell be forged and appropriately heat treated, due to the advantageous grain structure that is imparted.

Figure 4:
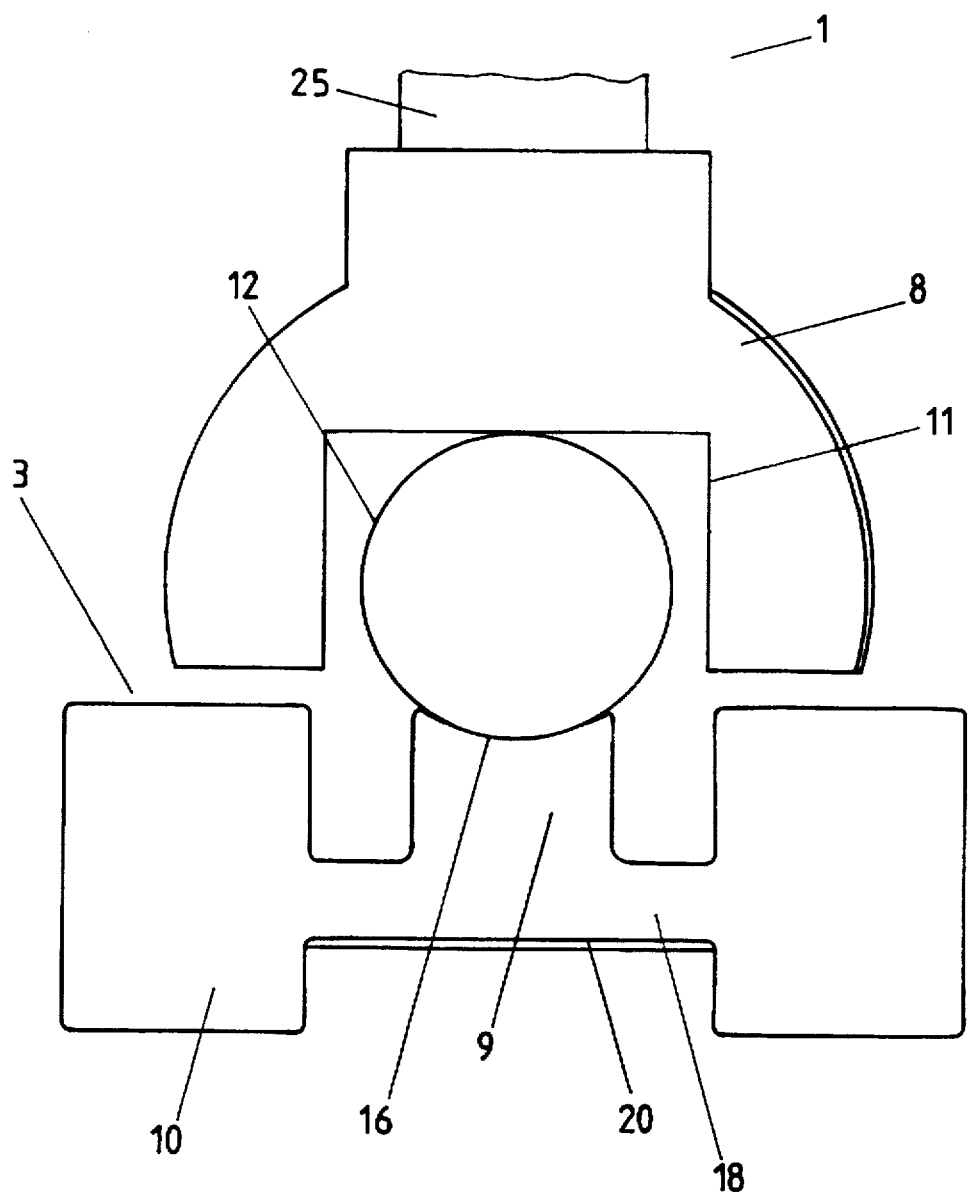
FIG. 4 shows a diametrical cross-section through the load cell and strut according to a third embodiment of the present invention

With reference to FIG. 4 a third embodiment of the present invention is shown, being a combination of the preferred embodiment described with reference to FIG. 2 and an aspect of the first embodiment of the invention described with reference to FIG. 1. The third embodiment of the invention is an identical load cell to that described with reference to FIG. 2, however rather than the strut bearing directly on central abutment 9, instead the strut 1 is provided with a central recess 11 within the bottom surface of retention member 8, which accommodates a spherical ball bearing 12 which rests in a spherically curved depression 16 of abutment 9. It has been found that this arrangement allows slight transverse movement, and consequently can be more accurate when used in conjunction with flexible platforms.

Strut 1 comprises a steel rod 25 which is threaded over length 14 to enable it to be bolted to a load bearing platform (not shown). In addition, use of a screw thread allows for convenient height adjustment. A resilient insert 15 is provided within base 4 to absorb impact loading on the foot, and to resist lateral forces.

The load cell, while conveniently of diaphragm configuration, need not use a strain gauge technology. Alternatives include a cell providing variable electrical capacitance as a result of diaphragm deflection or changes in resonant frequency arising from change in resonating mass at fixed stiffness.

In the preferred form of the invention, a diaphragm strain gauge is used, having a non-directional character. For example the strain gauge measures strain over the total periphery of the cell cavity, to ensure the cell is not sensitive to side loading in a particular direction. The preferred strain gauge 20 is of the configuration shown in FIG. 3, which is a known strain gauge normally used in pressure sensing devices, but adapted in this case for securing to the diaphragm of the load cell. The strain gauge has four resistive gauges 21, 22, 23, 24 arranged to give even coverage of the surface of the diaphragm. This allows the gauge to overcome the adverse effects of non-uniform strain caused by pressure on the trunnion 9. This strain gauge allows the diaphragm load cell of the preferred form of this invention to be very small but retain sufficient accuracy for its desired purpose.

In use, three or four load bearing feet of the type described above would be connected to the underside of a load bearing platform to support the platform on a load bearing surface, or in the case of a hanging platform, as few as one foot may be connected to the platform to support the platform from a load bearing support. The load cells would be connected to an electronic processor which would sum the signals received from each foot and provide a display of the weight of the load on the platform. The overall arrangement could typically be used for the weighing of animals. The present invention by providing a combination load transducer/load bearing foot means that the prime manufacturer of weighing systems of this type need only supply the requisite number of feet together with the appropriate electronic processing and display means. There is thus a saving in the supply of bulky beams as is currently done.

While the load bearing foot has been described with reference to a weighing system it could equally be used wherever it was necessary to measure forces in struts.

I claim:

1. A load bearing foot comprising:
   a housing having a base which in use is supported by a load bearing surface and an aperture in said housing opposite said base,
   a load cell means including an abutment portion adapted to receive an applied load, said load cell means mechanically supported by and within said housing, and
   a rigid strut having a lower end which bears against said abutment portion of said load cell means and extends outside said housing through said aperture, at least the portion of said strut passing through said aperture being significantly narrower than said aperture, said strut in use being connected to an applied load,
   said strut being free to move axially in a direction towards said load cell means, and said portion of said strut passing through said aperture being free to move laterally within the confines of said aperture.

2. A load bearing foot as claimed in claim 1, wherein said strut comprises a rod having a rod retention means connected thereto within said housing, said rod retention means being broader than said aperture preventing substantial movement of said rod in an axial direction away from said load cell means.

3. A load bearing foot as claimed in claim 2, wherein said housing defines a hemispherical interior surface with said aperture located at the pole thereof, said rod retention means is hemispherical in shape symmetric about a pole and at said pole is attached to said rod, the radius of each hemisphere being substantially equal and said aperture is of greater diameter than the diameter of said rod.

4. A load measuring transducer comprising:

a housing having a base which in use is supported by a load bearing surface and an aperture in said housing opposite said base, a load cell means including an abutment portion adapted to receive an applied load, said load cell means mechanically supported by and within said housing, and a strut having a lower end which bears against said abutment portion of said load cell means and extends outside said housing through said aperture, at least the portion of said strut passing through said aperture being significantly narrower than said aperture, said strut in use being connected to an applied load, said strut being free to move axially in a direction towards said load cell means, and said portion of said strut passing through said aperture being free to move laterally within the confines of said aperture, and said load cell means providing an electrical output which is a function of the applied load.

5. A load measuring transducer as claimed in claim 4, wherein said strut comprises a rod having a rod retention means connected thereto within said housing, said rod retention means being broader than said aperture preventing substantial movement of said rod in an axial direction away from said load cell means.

6. A load measuring transducer as claimed in claim 5, wherein said housing defines a hemispherical interior surface with said aperture located at the pole thereof, said rod retention means is hemispherical in shape symmetric about a pole and at said pole is attached to said rod, the radius of each hemisphere being substantially equal and said aperture is of greater diameter than the diameter of said rod.

7. A weighting system comprising:

a platform having an area to accommodate the physical dimensions of the load to be weighed, at least one foot attached to said platform to support it on a load bearing surface, each said foot including:

a housing having a base which in use is supported by the load bearing surface and an aperture in said housing opposite said base, a load cell means including an abutment portion adapted to receive an applied load, said load cell means mechanically supported by and within said housing, and a strut having a lower end which bears against said abutment portion of said load cell means and extends outside said housing through said aperture, at least the portion of said strut passing through said aperture being significantly narrower than said aperture, said strut being connected to said platform, said strut being free to move axially in a direction towards said load cell means, and said portion of said strut passing through said aperture being free to move laterally within the confines of said aperture, and electronic summing means which receive the electrical signals from each load cell and provide an output signal having a value which is a function of the weight of said load.

8. A weighing system as claimed in claim 7, wherein said strut comprises a rod having a rod retention means connected thereto within said housing, said rod retention means being broader than said aperture preventing substantial movement of said rod in an axial direction away from said load cell means.

9. A weighing system as claimed in claim 8, wherein said housing defines a hemispherical interior surface with said aperture located at the pole thereof, said rod retention means is hemispherical in shape symmetric about a pole and at said pole is attached to said rod, the radius of each hemisphere being substantially equal and said aperture is of greater diameter than the diameter of said rod.

10. A load bearing foot comprising:

a housing having a base which in use is supported by a load bearing surface and an aperture in said housing opposite said base, a load cell means including a load cell having a diaphragm and deformation measuring means adapted to provide a response variable by deformation of said diaphragm, an abutment portion located at the centre of said diaphragm, adapted to receive an applied load, and peripheral support means which mechanically support said diaphragm at its periphery within said housing, and a rigid strut having a lower end which bears against said abutment portion of said load cell means and extends outside said housing through said aperture, at least the portion of said strut passing through said aperture being significantly narrower than said aperture, said strut in use being connected to an applied load, said strut being free to move axially in a direction towards said load cell means, and said portion of said strut passing through said aperture being free to move laterally within the confines of said aperture.

11. A load bearing foot as claimed in claim 10, wherein said diaphragm is substantially circular and said abutment portion comprises an extension from the upper face of said diaphragm at the centre thereof, the axis of said extension being perpendicular to the plane of said diaphragm.

12. A load bearing foot as claimed in claim 10, wherein said peripheral support means comprises a ring member encircling and concentric with said diaphragm, and fashioned integrally therewith, said ring member having a downwardly extended supporting portion extending below the level of the lower surface of said diaphragm said base is substantially planar in the region of said load cell, and said ring member rests on said base, such that said diaphragm is supported above said base member in an elevated position by said ring portion.

13. A load bearing foot as claimed in claim 10, wherein said load cell means includes non-directional force transfer means, and said strut transfers load to said load cell through said force transfer means to reduce the transfer of lateral forces to said load cell.

14. A load bearing foot as claimed in claim 13, wherein said force transfer means comprises a ball means, presenting a convex exterior surface to each of said strut and said load cell, and is disposed there between, said strut bearing against said ball means and said ball means in turn bearing against said load cell means, and a ball retention means for retaining said ball means in position between said load cell and said lower end of said strut.

15. A load bearing foot as claimed in claim 14, wherein said ball retention means comprises an axially extending cavity in the lower end of said strut, said ball means is retained within said cavity by the opposition of said load cell, said cavity is of significantly larger dimension than the portion of said ball means disposed therein.

16. A load measuring transducer comprising:

a housing having a base which in use is supported by a load bearing surface and an aperture in said housing opposite said base, a load cell means including a load cell having a diaphragm and deformation measuring means adapted to provide a response variable by deformation of said diaphragm, an abutment portion located at the centre of said diaphragm, adapted to receive an applied load, and peripheral support means which mechanically support said diaphragm at its periphery within said housing, and a strut having a lower end which bears against said abutment portion of said load cell means and extends outside said housing through said aperture, at least the portion of said strut passing through said aperture being significantly narrower than said aperture, said strut in use being connected to an applied load, said strut being free to move axially in a direction towards said load cell means, and said portion of said strut passing through said aperture being free to move laterally within the confines of said aperture, and said load cell means providing an electrical output which is a function of the applied load.

17. A load measuring transducer as claimed in claim 16, wherein said diaphragm is substantially circular and said abutment portion comprises a cylindrical extension from the upper face of said diaphragm at the centre thereof, the axis of said extension being perpendicular to the plane of said diaphragm.

18. A load measuring transducer as claimed in claim 16, wherein said peripheral support meas comprises a ring member encircling and concentric with said diaphragm, and fashioned integrally therewith, said ring member having a downwardly extended supporting portion extending below the level of the lower surface of said diaphragm, said base is substantially planar in the region of said load cell, and said ring member rests on said base, such that said diaphragm is supported above said base member in an elevated position by said ring portion.

19. A load measuring transducer as claimed in claim 16, wherein said load cell means includes non-directional force transfer means, and said strut transfers load to said load cell through said force transfer means to reduce the transfer of lateral forces to said load cell.

20. A load measuring transducer as claimed in claim 19, wherein said force transfer means comprises a ball means, presenting a convex exterior surface to each of said strut and said load cell, and is disposed there between, said strut bearing against said ball means and said ball means in turn bearing against said load cell means, and a ball retention means for retaining said ball means in position between said load cell and said lower end of said strut.

21. A load measuring transducer as claimed in claim 20, wherein said ball retention means comprises an axially extending cavity in the lower end of said strut, said ball means is retained within said cavity by the opposition of said load cell, said cavity is of significantly larger dimension than the portion of said ball means disposed therein.

22. A weighting system comprising:

a platform having an area to accommodate the physical dimensions of the load to be weighed, at least one foot attached to said platform to support it on a load bearing surface, each said foot including:

a housing having a base which in use is supported by the load bearing surface and an aperture in said housing opposite said base, a load cell means including a load cell having a diaphragm and deformation measuring means adapted to provide a response variable by deformation of said of said diaphragm, an abutment portion located at the centre of said diaphragm, adapted to receive an applied load, and peripheral support means which mechanically support said diaphragm at its periphery within said housing, and a strut having a lower end which bears against said abutment portion of said load cell means and extends outside said housing through said aperture, at least the portion of said strut passing through said aperture being significantly narrower than said aperture, said strut being connected to said platform said strut being free to move axially in a direction towards said load cell means, and said portion of said strut passing through said aperture being free to move laterally within the confines of said aperture, and electronic summing means which receive the electrical signals from each load cell and provide an output signal having a value which is a function of the weight of said load.

23. A weighing system as claimed in claim 22, wherein said diaphragm is substantially circular and said abutment portion comprises a cylindrical extension from the upper face of said diaphragm at the centre thereof, the axis of said extension being perpendicular to the plane of said diaphragm.

24. A weighing system as claimed in claim 22, wherein said peripheral support means comprises a ring member encircling and concentric with said diaphragm, and fashioned integrally therewith, said ring member having a downwardly extended supporting portion extending below the level of the lower surface of said diaphragm, said base is substantially planar in the region of said load cell, and said ring member rests on said base, such that said diaphragm is supported above said base member in an elevated position by said ring portion.

25. A weighing system as claimed in claim 22, wherein said load cell means includes non-directional force transfer means, and said strut transfers load to said load cell through said force transfer means to reduce the transfer of lateral forces to said load cell.

26. A weighing system as claimed in claim 25, wherein said force transfer means comprises a ball means, presenting a convex exterior surface to each of said strut and said load cell, and is disposed there between, said strut bearing against said ball means and said ball means in turn bearing against said load cell means, and a ball retention means for retaining said ball means in position between said load cell and said lower end of said strut.

27. A weighing system as claimed in claim 26, wherein said ball retention means comprises an axially extending cavity in the lower end of said strut, said ball means is retained within said cavity by the opposition of said load cell, said cavity is of significantly larger dimension than the portion of said ball means disposed therein.

* * * * *